Patented July 4, 1950

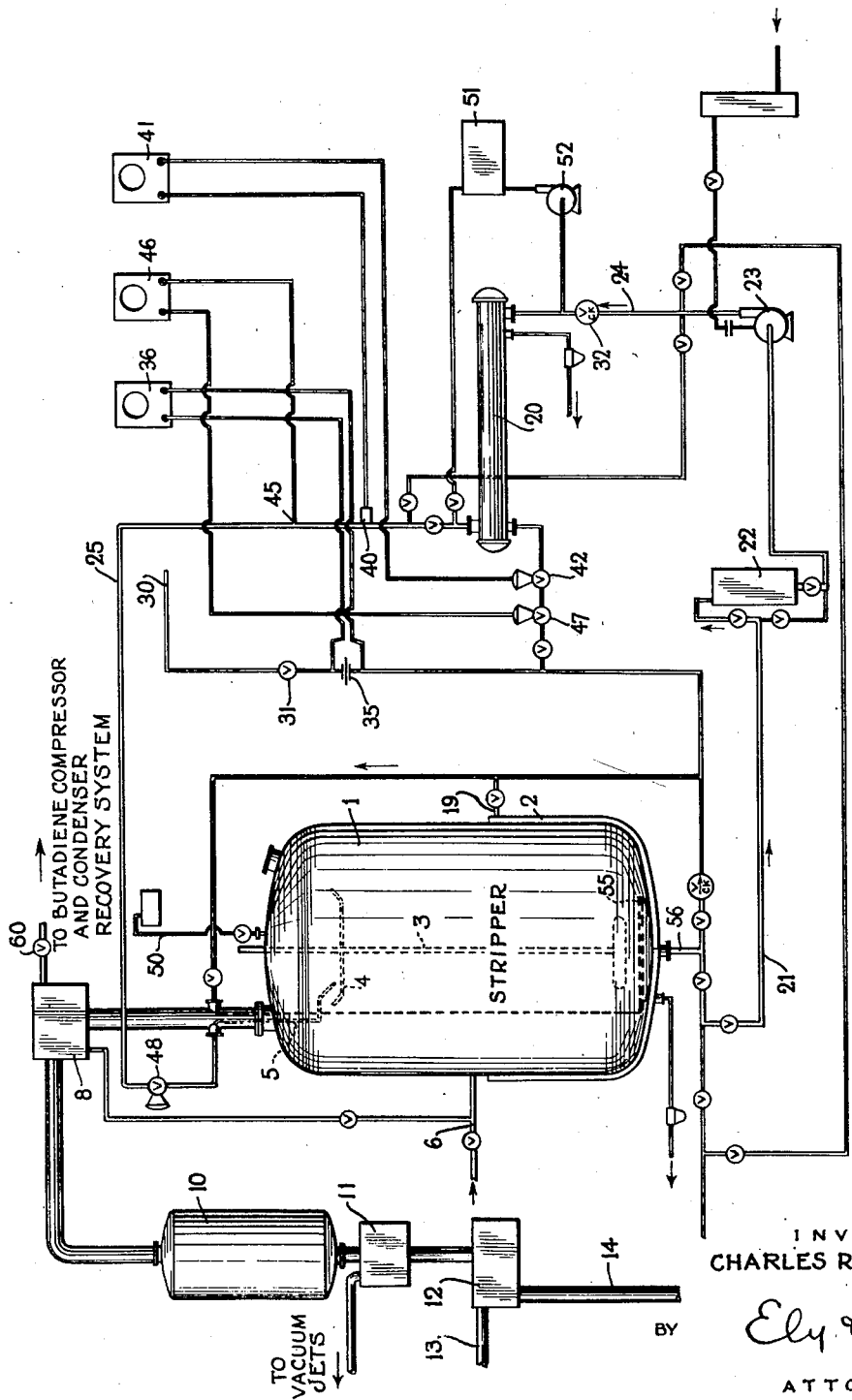

2,514,207

UNITED STATES PATENT OFFICE 2,514,207

SIMULTANEOUS RECOVERY OF STYRENE, ETC., AND CONCENTRATION OF LATEX

Charles R. Johnson, Akron, Ohio, assignor to The Firestone Tire & Rubber Company, Akron, Ohio, a corporation of Ohio Application July 25, 1947, Serial No. 763,515

1 Claim. (Cl. 202—53)

This invention relates to the recovery of excess styrene, acrylonitrile or other low-boiling, steam distillable, liquid monomer from a polymerization reaction in which a large amount of the monomer is polymerized in an aqueous emulsion, and is particularly characterized by concentration of the latex simultaneously with recovery of the excess monomer. The polymerization may involve reaction with another monomer, which may be liquid or gaseous. If gaseous, such as butadiene-1,3, for example, the gaseous monomer will ordinarily first be removed from the aqueous reaction mixture before the simultaneous concentration and recovery of liquid monomer which is the subject of this invention. For instance, the process may be used in concentrating a latex of rubber-like particles produced by emulsion copolymerization of a gaseous conjugated diene and a liquid monomer; e. g., the copolymerization of butadiene and styrene in the production of the rubber known as GR-S or the copolymerization of butadiene and acrylonitrile in the production of Buna N. The polymer or copolymer produced may be rubber-like or a plastic having no rubber-like properties.

Other conjugated dienes which may be used in polymerizations from which unreacted low-boiling, steam-distillable monomer may be recovered as herein contemplated include, for example, isoprene, 2-cyanobutadiene, cyclopentadiene, piperylene, dimethylbutadiene, 2-methyl-1,3-pentadiene, etc. Such monomers may be reacted with a vinyl aromatic compound, such as styrene, alpha-methylstyrene, nuclear-substituted styrenes, monochlorostyrene, dichlorostyrene, vinylnaphthalene, vinylbiphenyl, vinylcarbazole, 2-vinyl-5-ethylpyridine, 2-ethyl-5-vinylpyridine. On the other hand, the monomer reacted with the conjugated diene may be acrylonitrile or a substituted acrylonitrile, such as meth-, eth-, prop- or chloroacrylonitrile or an acrylic acid ester or ketone or acidamide, etc. Monomers such as isoprene, etc., need not be copolymerized with another monomer but may be self-polymerized.

The invention relates more particularly to the removal of styrene and simultaneous concentration of the latex reaction mixture obtained by emulsion copolymerization of butadiene and styrene to produce a rubber-like latex such as GR-S latex, etc. Any of the well-known formulae for such copolymerization may be employed, such as:

|  | Parts per 100 parts total monomer |
|---|---|
| Water | 180 |
| Butadiene | 71 |
| Styrene | 29 |
| Modifier | 0.5 |
| Potassium persulfate | 0.25 |
| Soap (anhydrous basis) | 4.60 |
| Antioxidant | 1.5 |

To produce the best rubber-like product, the reaction is not carried to completion, but only 50 per cent, or generally up to 70 to 95 per cent of the monomers used are reacted. The unreacted monomers are then preferably recovered before coagulation of the product. According to this invention such recovery is carried out simultaneously with concentration of the latex.

The invention will be described more particularly as applied to such polymerization of butadiene-1,3 and styrene. At the present time it is customary to remove gaseous butadiene from the aqueous reaction mixture resulting from aqueous copolymerization of these monomers. Then styrene is steam distilled from the aqueous product under vacuum without concentration of the latex. If the latex is ever concentrated, it is generally shipped to the point of ultimate use before concentration. So far as is known, it has never been concentrated in the stripping operation.

According to this invention the latex is concentrated simultaneously with the stripping of the styrene from the latex, and the operation is conducted in a most economical manner either as a batch operation or a continuous operation by efficient use of the heat of steam in a heat-exchanger. If the operation is a batch operation, the latex being treated may be recirculated through the stripping equipment and pass through a heat-exchanger before each passage through the stripper. If the operation is continuous, the stripping and concentration will advantageously be effected in a series of vessels with heat-exchangers located between them unless the liquid is to be recirculated through one or more of the several vessels, in which case the heat-exchanger may be located in the recirculating line. Any suitable tower or other vessel may be used.

The operation is economical, and present plants can easily be converted because the most expensive elements of the apparatus required are already employed in the present stripping of the styrene. The concentration of the latex may be accomplished without much additional steam and, as a matter of fact, in certain operations no additional steam is required. Condensate produced from the steam used is not added to the latex but is separately recovered and has no effect on the solids content of the latex.

The operation will be further described in connection with the accompanying drawing which shows more or less diagrammatically the equipment employed and illustrates the process, which is the subject of the invention.

The stripper 1 is not essentially different from that now in use except that it is preferably steam-jacketed, as shown at 2. The agitator 3 is provided near its upper end with a slinger ring 4, which is simply a distribution plate, the periphery of which is preferably raised at a slight angle. The heated latex is fed onto the slinger ring through the feed pipe 5. The slinger ring rotates rapidly with the agitator and throws a fine film of the latex which washes the walls continually, preventing the accumulation of any solid matter on them. The feed line 6 is used for charging an initial charge to the stripper and returning entrained liquid from the surge tank 8 through which the gases pass on leaving the stripper.

The steam and styrene vapors released from the latex pass from the stripper through the surge tank 8 to the styrene condenser 10. The condensate passes through the knockout tank 11 to the decanter 12. Vacuum jets connected with the knockout tank maintain the system under vacuum. The styrene is taken off through the overflow pipe 13, and the aqueous waste is discharged through the barometric leg 14.

Some steam for heating the latex may be supplied through the line 19 to the jacket 2. This is optional and will depend upon the system employed and the material under treatment, etc. The main supply of heat is introduced into the system in the heat-exchanger 20. Latex is drawn off from the bottom of the stripper and sucked through the suction line 21 and the strainer 22 by the centrifugal pump 23. A pump such as the well-known Tri-Clover latex pump has given satisfactory results. The delivery end of the pump is connected with the heat-exchanger 20 through the line 24. From the heat-exchanger the heated latex is returned to the stripper through the line 25.

The steam which is used is introduced into the recovery system through the line 30. The amount of steam which enters the system is ordinarily regulated at the valve 31. The orifice plate 35 in the steam line just beyond the valve 31 measures the flow of steam into the system, and this is recorded on the flow meter 36. This meter may be omitted, and any suitable measuring means may be employed.

The heat-exchanger 20 may be located below the liquid level in the stripper so that the passages through which the latex flows are filled at all times. The valve 32 is shown as a check valve to keep these passages full. These passages are preferably large—for example, about 2 inches in diameter—and are preferably straight and not too long so that the job of cleaning is not too difficult. Eleven-foot tubes have worked satisfactorily. If for some reason the pump 23 fails or a leak occurs or for some other reason the temperature at the thermowell 40, located at the discharge from the heat-exchanger, rises, the control 41 shuts off the steam at the valve 42. If the pressure at 45 on the discharge end of the heat-exchanger drops due to failure of the pump 23 or for any other cause, the pressure controller 46 closes both the valve 47 which controls the flow of steam into the heat-exchanger and the valve 48 which maintains a back pressure on the heat-exchanger to keep the water and monomer in the latex below the boiling point. Thus, the controls 41 and 46 maintain a back pressure on the heat-exchanger to keep the liquids in the latex below their boiling points and prevent them from becoming overheated. The heat-exchanger is thus maintained full of liquid, and this prevents drying and consequent coking or hardening of a deposit within the latex passages.

It is advantageous to add pine-tar oil as a defoamer by dripping it into the stripper through the line 50. Alternatively, with the aid of a proportioning-type pump a small amount may be fed to the stripper with the latex.

The tank 51 is used for the collection of a flushing medium, such as styrene, which is circulated through the heat-exchanger periodically to help keep its walls free from deposits.

The steam sparger 55 is located in the bottom of the stripper for the introduction of live steam into the stripper as the occasion may demand. It is connected to the steam supply by the line 56. It is thus possible to introduce supplemental steam into the system to control the concentration of the latex and maintain it at any desired solids content.

In a commercial operation such as that for which the equipment shown in the drawings is designed, it will be desirable to have two strainers 22 arranged in parallel, two pumps 23 arranged in parallel, and two heat-exchanger units 20 arranged in parallel. Then when one is down for repairs, the recovery operation may be continued by cutting in the other. Suitable piping and valves are provided as required.

Suitable by-passes, etc., are provided as indicated.

Although the latex may be treated in a continuous process as by treatment in one or a plurality of columns arranged in series, the stripper 1 illustrated in the drawings is for a batch operation. The stripper is under vacuum as the batch is introduced into it. The latex is at about 120° F. and is maintained at this temperature. The vacuum is maintained by the butadiene compressor and condenser recovery system indicated as connected with the surge tank 8 at the top of the drawing. The vacuum is maintained on the batch to recover the butadiene till a vacuum of about 22 inches of mercury is drawn. This will take about one hour. Then the valve 60 in the line leading from the surge tank to the butadiene condenser and recovery system is closed. The gases are thereafter passed from the surge tank 8 through the styrene condenser 10 and the vacuum jets indicated at the left-hand margin of the drawing, to the butadiene recovery system. The gases are evacuated from the stripper through this system until about one-half hour after the temperature of the latex has dropped, indicating distillation of styrene or water from the latex. The styrene steam distillation process is started as soon as the temperature has dropped about 10° F. After the steam distillation process has been in progress for one-half hour, it is assumed that all of the butadiene has been removed from the system so that thereafter the gases from the vacuum jets are vented to the atmosphere instead of passing through the butadiene recovery system.

Sufficient heat is introduced to the system through the steam jacket and heat-exchanger and possibly also directly into the stripper to effect concentration of the latex simultaneously with stripping and recovery of the styrene from the aqueous mixture resulting from the emulsion polymerization reaction. If all the steam required for heating is introduced through a steam jacket, not only will a large area of heating surface be required but difficulties are apt to result through inability to efficiently keep the exposed surfaces free of deposited latex. Some steam may be introduced through a jacket, such as the jacket 2, without objectionable deposit of solids. However, the main portion of the heat transfer is effected in a separate heat-exchanger 20. The steam is introduced into this heat-exchanger from line 35 through the valves 47 and 42. The heat which is required to be introduced into the system will, of course, vary with the type of operation being performed. The following table illustrates the calculated requirements for polymerization of styrene and butadiene with concentration of the latex to the given solids content:

| | Latex Concentration Data | | |
|---|---|---|---|
| | GR-S Types I and II | GR-S Type III | Special |
| Rubber per batch, pounds | 6,600 | 8,800 | 8,800 |
| Total solids, Ave. percent | 26.0— | 38.0— | 50.0— |
| Total solids, Final percent | 50.0— | 50.0— | 60.0— |
| Original batch, pounds | 25,400 | 23,150 | 17,600 |
| Final batch, pounds | 13,200 | 17,600 | 14,670 |
| Evaporation per batch: | | | |
|   Water, pounds | 11,500 | 4,440 | 1,820 |
|   Styrene, pounds | 700 | 1,110 | 1,110 |
| B. t. u. requirement per batch: | | | |
|   Heating up (110–140° F.) | 686,000 | 556,000 | 556,000 |
|   Water evaporation | 12,650,000 | 4,880,000 | 2,000,000 |
|   Styrene evaporation | 107,000 | 170,000 | 170,000 |
|     Total | 13,443,000 | 5,606,000 | 2,726,000 |
| Total steam required for concentrating only, pounds | 14,439 | 6,021 | 2,928 |
| Steam required for recovery only, pounds | 6,000 | 1,479 | 4,572 |

The figures in the first column are for the production of a batch of GR-S latex, types I and II, from the well-known formula previously given. The figures in the second column refer to the production of type III latex, using about 50 parts styrene and 50 parts butadiene, using a rosin-soap modifier. The solids content of this type of latex (line 2) is 12 per cent higher than for types I and II. The third column refers to treatment of a special latex, comparable to type III but of much higher initial solids content. The final solids content is much higher than that obtained with the other latices. The figures given are estimates. They assume that a vacuum of about 25 inches of mercury will be maintained and that the steam used will be desuperheated at 30 pounds gauge pressure.

The figures listed in the next to the bottom line of the table ("total steam required for concentrating only (lbs.)") are the pounds of steam which would be required in each case to be added to the jacket and/or heat-exchanger to concentrate the latex from the initial to the final total solids as listed above in the table. The figures listed in the bottom row are the pounds of steam which would be required in each case to steam distill the pounds of styrene from the latex.

To illustrate (referring to the figures in the last two lines of the table and the percentages given in the second and third lines): If it were desired to concentrate GR-S types II and I latices from 26 to 50 per cent total solids, it would be necessary to add 14,439 pounds of steam to the heat-exchangers and during the stripping process all the styrene would be recovered since only the first 6,000 pounds are needed to recover the styrene. When concentrating GR-S type III latex from 38 to 50 per cent total solids, 6,021 pounds of steam would be added to the heat-exchanger and 1,479 pounds of steam (the difference between 7,500 and 6,021) would be added directly to the latex so that a total of 7,500 pounds of steam would be used to recover the styrene. Similarly, to concentrate the special latex from 50 to 60 per cent total solids, 2,928 pounds of steam would be added to the heat-exchangers and 4,572 pounds (the difference between 7,500 and 2,928) would be added directly to the latex so that the 7,500 pounds of steam which are necessary to recover the styrene would be effectively used.

At times it may be economical to introduce some of the steam through the steam jacket. The jacket may be omitted and all of the steam may be used in the heat-exchanger. At times some live steam may be introduced into the system through the steam sparger 55, as explained. The temperature, pressure, and amount of steam should be balanced with that introduced directly and that used in the jacket and heat-exchanger to give the desired stripping and desired concentration of the product.

For continuous operation several treating units may be connected in series with heat-exchangers between them. Part of the discharge from a single stripper or from one or more of a plurality of strippers may be recirculated back through the heat-exchanger and stripper as required. A column may be used instead of the type of stripper more particularly described herein. It is not necessary to employ a vacuum although ordinarily this will be found desirable.

The invention is not limited to the specific disclosure but is defined in the appended claim.

What I claim is:

The process of producing concentrated latex of butadiene-styrene copolymer which comprises as a batch operation flash-distilling unreacted excess butadiene from latex resulting from emulsion polymerization of butadiene and styrene, which latex contains unreacted excess styrene as well as the unreacted excess butadiene, heating the resulting latex indirectly with steam under pressure and then returning it to the zone where said flash-distillation of the excess butadiene occurred and there subjecting it to a vacuum of the order of about 25 inches of mercury to volatilize said excess styrene and simultaneously concentrate the latex by volatilizing water therefrom, adding the resulting latex to that from which the butadiene has been flashed while conveying away the liberated styrene and water vapor, and, until a latex of desired concentration is obtained, continuing to impart heat to the latex by indirect contact with steam and flashing styrene and water therefrom while flushing with latex the latex-retaining surfaces heated by the steam to prevent deposition of solids thereon.

CHARLES R. JOHNSON.

REFERENCES CITED

The following references are of record in the file of this patent:

UNITED STATES PATENTS

| Number | Name | Date |
|---|---|---|
| 1,951,241 | Goranflo | Mar. 13, 1934 |
| 1,997,171 | French | Apr. 9, 1935 |
| 2,054,096 | Potts et al. | Sept. 15, 1936 |
| 2,324,088 | Jewett | July 13, 1943 |
| 2,467,769 | Morrow et al. | Apr. 14, 1949 |

OTHER REFERENCES

Brotham et al., "Batch-Continuous Process for Buna S," Chemical and Metallurgical Engineering, March 1933, pages 108–112; (Copy in Scientific Library 260/.93.)